(12) United States Patent
Bonko

(10) Patent No.: US 6,382,284 B1
(45) Date of Patent: *May 7, 2002

(54) FARM TRACTOR HAVING ASYMMETRIC DIRECTIONAL DRIVE AXLE TIRES

(75) Inventor: Mark Leonard Bonko, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,073

(22) Filed: Mar. 29, 2000

Related U.S. Application Data

(63) Continuation of application No. 09/101,055, filed as application No. PCT/US97/07008 on Apr. 25, 1997, now Pat. No. 6,062,282.

(51) Int. Cl.⁷ ........................ B60C 11/11; B60C 107/02
(52) U.S. Cl. ................... 152/209.8; 152/209.12; 152/209.28; 152/904
(58) Field of Search ............... 152/209.8, 209.9, 152/209.12, 209.13, 902, 904, 209.28

(56) References Cited

U.S. PATENT DOCUMENTS

| | | | | |
|---|---|---|---|---|
| 2,154,290 A | * | 4/1939 | Snyder | 152/209.12 |
| 2,203,617 A | * | 6/1940 | Hale | 152/209.12 |
| 3,603,370 A | | 9/1971 | Hylbert et al. | 152/209 |
| 4,383,567 A | | 5/1983 | Crum et al. | 152/209 B |
| 4,534,392 A | | 8/1985 | Bonko et al. | 152/209 B |
| 4,711,283 A | | 12/1987 | Bonko et al. | 152/209 B |
| D295,399 S | * | 4/1988 | Nishio et al. | D12/147 |
| D303,365 S | | 9/1989 | Bonko | D12/151 |
| D303,366 S | | 9/1989 | Bonko | D12/151 |
| D303,367 S | | 9/1989 | Bonio et al. | D12/151 |
| D303,779 S | | 10/1989 | Bonko | D12/151 |
| D304,320 S | | 10/1989 | Bonko | D12/151 |
| 5,016,696 A | | 5/1991 | Bonko et al. | 152/209.12 |
| 5,046,541 A | | 9/1991 | Bonko | 152/209 B |
| 5,318,086 A | | 6/1994 | Narumi et al. | 152/209 B |
| 5,360,043 A | * | 11/1994 | Croyle | 152/209.9 |
| 5,411,067 A | | 5/1995 | Beeghly et al. | 152/209 B |
| 5,421,388 A | | 6/1995 | Bonko et al. | 152/209 B |
| D362,222 S | | 9/1995 | Guspodin et al. | D12/147 |
| 5,464,050 A | | 11/1995 | Bonko | 152/209 B |
| D377,923 S | | 2/1997 | Bonko | D12/147 |
| D405,404 S | | 2/1999 | Bonko | D12/147 |
| 5,901,765 A | | 5/1999 | Bonko | 152/209 B |
| D410,873 S | | 6/1999 | Bonko | D12/151 |
| 6,062,282 A | * | 5/2000 | Bonko | 152/209.12 |
| 6,209,602 B1 | * | 4/2001 | Bonko | 152/209.12 |
| 6,263,933 B1 | * | 7/2001 | Baus | 152/209.12 |

FOREIGN PATENT DOCUMENTS

| | | | | |
|---|---|---|---|---|
| DE | 29521289 | | 1/1997 | B60C/5/18 |
| DE | 3815829 | * | 12/1998 | 152/209.8 |
| EP | 423058 A2 | | 4/1991 | B60C/11/08 |
| FR | 360008 | * | 4/1906 | 152/904 |
| FR | 2157211 | * | 5/1973 | 152/209.12 |
| GB | 12926 | * | 6/1910 | 152/209.12 |
| GB | 2042992 | | 10/1980 | 152/209 B |
| GB | 1591139 | * | 6/1981 | 152/209.12 |
| JP | 57-167802 | | 10/1992 | 152/209.12 |
| SU | 1133122 | | 1/1985 | 152/209 B |
| SU | 1284847 | | 1/1987 | 152/209 B |

* cited by examiner

*Primary Examiner*—Steven D. Maki
(74) *Attorney, Agent, or Firm*—David L. King

(57) ABSTRACT

A farm tractor has a vehicle having a pair of pneumatic agricultural tires 20 having an asymmetric directional tread 32 with lugs 50A,50B,50C arranged in a chevron type pattern 70,72. The chevron pattern 70,72 is asymmetric having the apex or point 74 lying entirely on one-half 32A or 32B of the tread 32 thus creating soil discharge channels 89,82 that are greater on one tread half 32A or 32B relative to the other tread half 32A or 32B. This tread pattern permits the employment of lugs 50A, 50B of substantially equal lug length $l_l$ insuring more uniform wear characteristics.

8 Claims, 9 Drawing Sheets

FARM TRACTOR HAVING ASYMMETRIC DIRECTIONAL DRIVE AXLE TIRES

This is a continuation of application Ser. No. 09/101,055, filed on Jun. 25, 1998, now U.S. Pat. No. 6,062,282, which is a 371 of PCT/US97/07008 filed Apr. 25, 1997.

TECHNICAL FIELD

This invention relates to a directional pneumatic agricultural tire for use on farm tractors and similar agricultural type vehicles.

BACKGROUND ART

Tractor tires must have good vibration characteristics on and off the road while maintaining good traction or draw bar characteristics. Such tires must also provide for the removal of soil, mud, etc., during infield use.

The tractive power propelling the vehicle is primarily provided through and transmitted by large lugs that are typically oriented in a directional pattern. This directional pattern generally employs the use of what is commonly called or referred to as long bars or a combination of long bars and short bars. Typically, these patterns of lugs are designed to have two rows of shoulder lugs, one row extending from each shoulder of the tire towards the equatorial plane. The volumetric space between the lugs is commonly referred to as the soil discharge channels. These channels provide a means for compacted soil to discharge over the tire shoulder. This feature prevents the tire from packing with mud and enables the tire to maintain a self-cleaning capability. Generally, these tires having two rows of shoulder lugs are arranged such that the lugs create a V or chevron-type pattern, these patterns usually are centered about the equatorial plane. If they are not centered they are typically alternating such that the chevron is on one side of the equatorial plane and the next set of circumferentially adjacent lugs have a chevron which is on the opposite side of the equatorial plane. This alternating pattern is repeated such that there is a balancing effect of the chevrons. For the purposes of this invention, these alternating chevrons on one side or the other of the equatorial plane in a repeating fashion are considered symmetrical in that as the tire passes through its footprint, that is the portion of the tire contacting the ground surface, the soil discharge channels within the footprint typically average out such that the average volume within the channel is equal on the left side of the equatorial plane versus the right side of the equatorial plane. Such a tire demonstrating a long bar/short bar combination is exhibited in U.S. Pat. No. 4,383,567 and is commonly referred to in the commercial market place as the Goodyear DynaTorque II radial tire.

Another tire using a similar long bar/short bar combination is taught in U.S. Pat. No. 4,534,392. This tire is commonly referred to as the Goodyear DynaTorque Radial and the Kelly-Springfield PowerMac L/S Radial Tractor Tire. This particular tire used a combination of two long bars separated by a short bar and repeated by two long bars and this pattern is repeated on both sides of the tire. This tread pattern is such that it again exhibits a combination of chevrons that have a resultant pattern such that the soil discharge channels as the tire passes through the footprint tend to equalize.

The prior art tires typically had several characteristics in common. One being the employment of a large number of lugs where at least one of the lugs would always cross the centerline of the tire. These tires had several beneficial tractive performance characteristics in that they were good in most soil conditions and provided good draw bar traction. The problem that was prevalent in these types of designs is that the short bar would tend to wear out more rapidly than the long bars. The resultant effect is that an uneven wear pattern would be generated in the tire after a period of time. This meant that the farmer would perceive the tire as being irregularly worn and therefore he considered the employment of a short bar detrimental to the performance of the product.

In 1992, The Goodyear Tire & Rubber Company introduced a new tractor tire having two sets of primary and secondary lugs. The tire was commercially identified as a DT710 and is described in U.S. Pat. No. 5,046,541. As described in the patent, this tire has good traction, vibration and cleaning characteristics. These primary and secondary lugs are shorter in length than most tractor tire lugs. The tire effectively increased the number of lugs and therefore an increase in lug surface area resulted. This increased the performance capabilities of the tire. The flexible nature of these relatively short lugs also helped reduce the soil compaction potential of the tire even though more lug surface area was employed.

In 1995, U.S. Pat. No. 5,411,067 taught that the tire described above as U.S. Pat. No. 4,534,392 the Goodyear DynaTorque Radial and Kelly-Springfield PowerMac L/S Radial Tractor tires could be modified by the employment of a notch in at least each of the long bars across the equatorial plane. This notch could be of partial or full depth. By notching the long bar the tire achieved increased flexibility and reduced soil compaction while further enhancing the tractive capability of the tire. This pattern had the resultant effect of the directional symmetrical patterned tires in that the soil discharge channels throughout the footprint on average from left side to right side were equal as the tire rolled through the soil.

Each of the tires described above had several key limitations; one being that the employment of short lugs in combination with long bar lugs inherently results in a potential nonuniform treadwear problem. Alternatively, the employment of short lugs such as the DT710 although resulting in very uniform wear has bars that are substantially shorter than the typical lugs and as a result the tread although wearing uniformly is perceived by the farmer to have the potential of wearing out quickly because the lugs are substantially shorter than the conventional lugs. This in spite of the fact that there is a larger surface area in the use of the D1710 type short lugs with the resultant effect of more lug surfacing contact as the tire rolls therefore enhancing the wear and durability of this particular tire. Nevertheless, the customer perceives the potential for fast wear due to the use of short lugs.

SUMMARY OF THE INVENTION

A tractor of the present invention (10) has a drive axle having mounted thereto a pair of pneumatic agricultural tires 20A, 20B, each having an asymmetric directional tread pattern.

The tire has the unique asymmetric directional tread pattern such that the soil discharge channels between the lugs on one side of the tire are uniformly greater than the soil discharge channels created on the opposite side of the tire. This creates a unique asymmetric soil discharge channel. Additionally, the inventive tire has two rows of shoulder lugs, the lugs being of substantially equal lengths which enables the tire to exhibit very uniform wear patterns.

A pneumatic agricultural tire 20 having a maximum section width (SW), an axis of rotation (R), an equatorial plane (EP) centered between the maximum section width (SW) and perpendicular to the axis (R) is described. The tire 20 has a casing having a carcass 21 having one or more plies 22 reinforced with rubber coated cords 22A and has a rubber tread 32 disposed radially outwardly of the casing. The tread 32 has first and second lateral tread edges 32A,33B; the distance between the lateral tread edges 33A,33B defines the tread width (TW). The tread 32 has an inner tread 34 and a plurality of lugs 50A,50B,50C projecting radially outwardly from the inner tread 34. The tread lugs 50A,50B and 50C have a length $l_l$, and a width $l_w$, the ratio of the lug length $l_l$ to lug width $l_w$ is at least three times, preferably at least three times.

The tread 32 has a plurality of shoulder lugs 50A and 50B. The plurality of shoulder lugs 50A,50B are divided into a first row of shoulder lugs 50A extending from the first lateral edge 33A respectively towards the equatorial plane and a second row of shoulder lugs SOB extending from the second lateral edge 33B. The lugs 50A of the first row are circumferentially offset relative to the lugs 50B of the second row. A plurality of similarly oriented central lugs 50C are arranged in row and each central lug 50C extends across the equatorial plane EP. The lugs of the first row of shoulder lugs 50A are substantially aligned with the central lugs 50C along their respective lug lengths $l_l$, while the shoulder lugs 50B of the second row are similar but oppositely oriented relative to the first row of shoulder lugs 50A. The combination of shoulder lugs 50A,50B and central rugs 50C form an asymmetric chevron pattern 70,72 having a point 74 of the chevron 70,72 located between the equatorial plane EP and the second lateral edge 33B. A primary leg 76 of the chevron 70,72 lies along the substantially aligned lengths of the shoulder lugs 50A of the first row and the central lugs 50C. A secondary leg 78 of the chevron 70,72 lies along the length of the shoulder lugs 50B of the second row and the point 74 of the chevron 70,72.

In the preferred embodiment each of the shoulder lugs 50A of the first row are similar in shape and length. Similarly, each of the shoulder lugs 50B of the second row are of similar shape and length. It is most preferred that both the shoulder lugs 50A and 50B of the first and the second row are of similar shape and length. This is believed to improve the uniform wear of this tread pattern.

It is believed preferable that the circumferentially adjacent chevrons 70,72 have a circumferential overlap (O) as measured by axially extending lines 84,86, the overlapping (O) distance between these lines 84,86 at the extremes of the circumferential overlap being at least 25% of the total circumferential extent (T) of a chevron 70,72 enables the tire 20 to achieve extremely uniform ride and handling characteristics. The shoulder lugs 50A,50B each have an axially outer end 53 and an axially inner end 51. The axially outer ends 53 of the shoulder lugs 50A of the first row are circumferentially offset relative to the axially outer ends 53 of the shoulder lugs 50B of the second row as measured as the distance X circumferentially between axial lines 90,92 tangent to the extremes of the axially outer ends 53. The circumferential offset distance X is at least 75% of the circumferential distance between the axially inner 51 and axially outer ends 53 of the shoulder lugs 50A of the first row. In a preferred embodiment of the tire 20, the tire 20 has a net gross ratio as measured around the entire circumference of the tire of less than 35%, preferably about 22%.

In order to maintain this open tread pattern, each tread lug 50A,50B,50C is spaced a minimum distance(s) of 1.5 the lug width (lw) from an adjacent lug 50A,50B, or 50C. The central lugs are spaced a minimum distance of 1.5 times the central lug width from an adjacent central lug such that the central lugs do not overlap in the circumferential direction.

BRIEF DESCRIPTION OF DRAWINGS

The following is a brief description of the drawings in which like parts bear like reference numerals and in which.

Definitions

Figure 1:
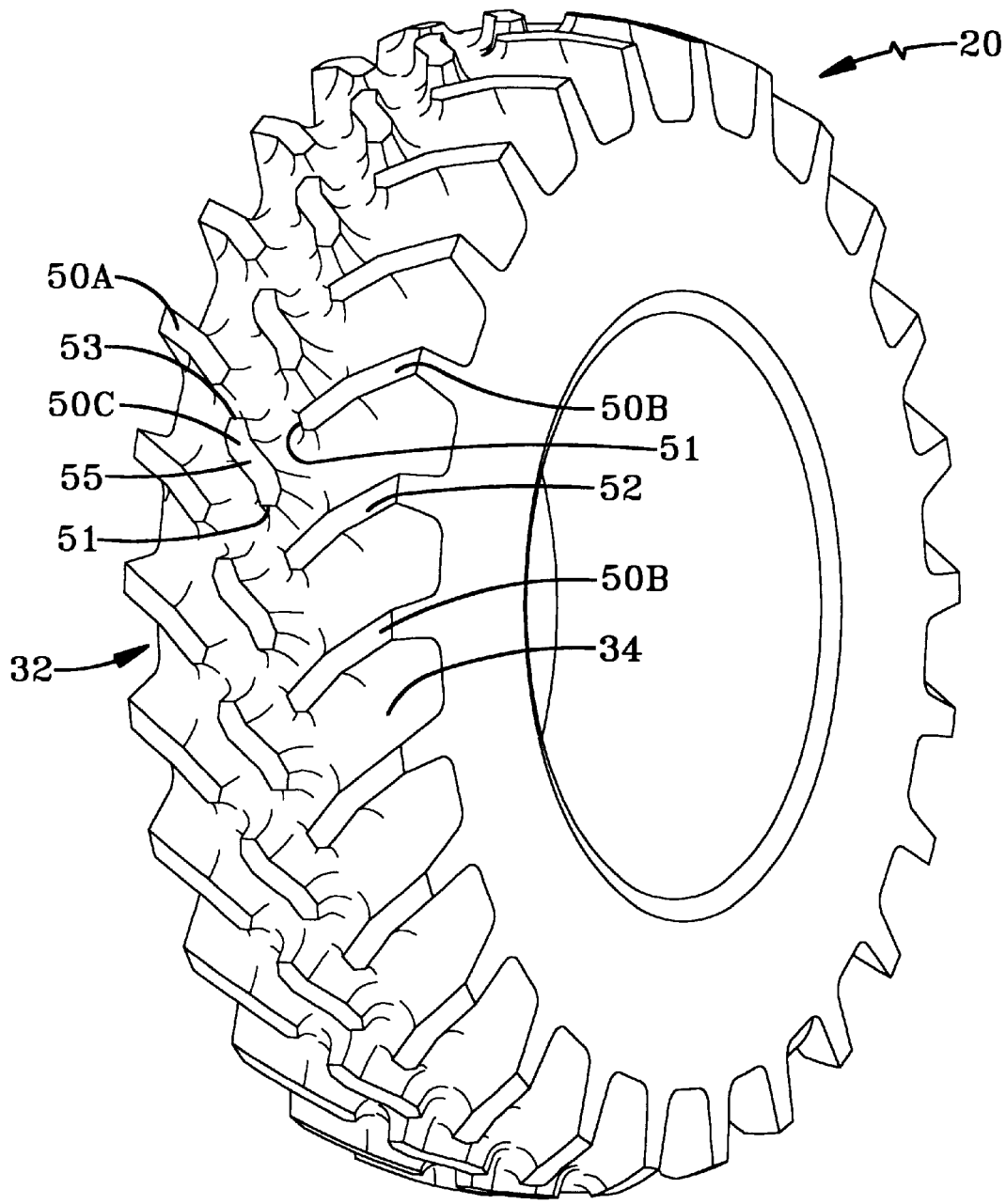
FIG. 1 is a perspective view of the preferred tire according to the present invention.
Figure 2:
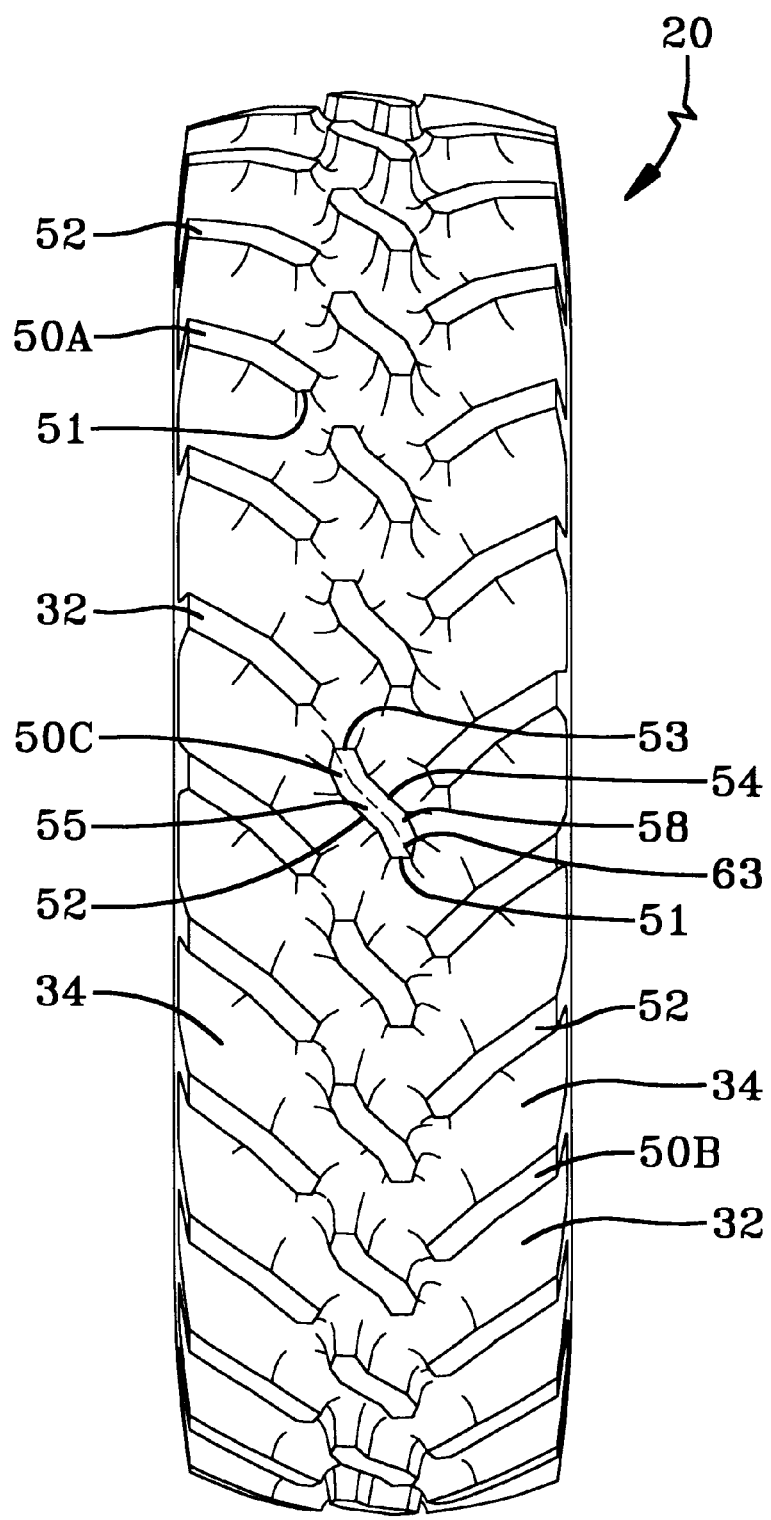
FIG. 2 is a plan view of the preferred tire according to the present invention.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization-Standards Manual and the term design rim means the same as the standard measurement rims. In Japan, the standard organization is The Japan Automobile Tire Manufacturer's Association.

"Design rim width" is the specific commercially, available rim width assigned to each tire size and typically is between 75% and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross ratio" means the ratio of the normally loaded and normally inflated tire tread rubber that makes contact with a hard flat surface, divided by the area of the tread, including non-contacting portions such as grooves as measured around the entire circumference of the tire.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire. "Radial" and "radially" means directions radially toward or away from the axis of rotation of the tire.

"Radial-ply tire" means a belted or circumferentially restricted pneumatic tire in which the ply cords, which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference.

"Trailing" refers to a portion or part of the tread that contacts the ground last, with respect to a series of such parts or portions during rotation of the tire in the direction of travel.

"Tread arc width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subjected to any load.

"Tread width" means the arc length of the tread surface in the axial direction, that is, in a plane passing through the axis of rotation of the tire.

"Unit tread pressure" means the radial load borne per unit area (square centimeter or square inch) of the tread surface when that area is in the footprint of the normally inflated and normally loaded tire.

DETAILED DESCRIPTION OF THE INVENTION

Figure 5:
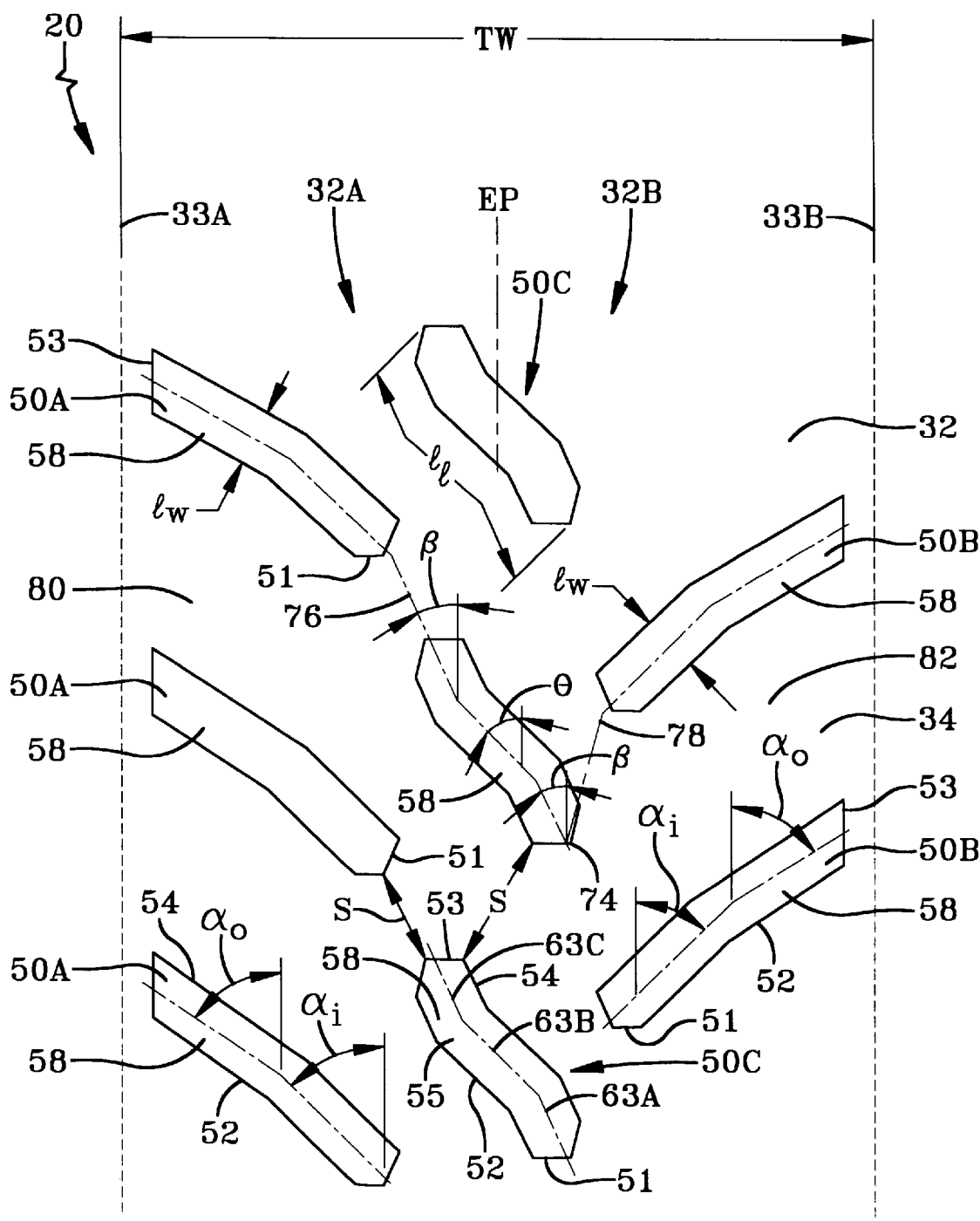
FIG. 5 is a plan view of a portion of the contact patch of the preferred tire according to the present invention.

Now referring to FIG. 5, a tire is shown in cross-section view generally as reference numeral 20. The pneumatic tire 20 has a carcass 21 having one or more carcass plies 22 extending circumferentially about the axis of rotation of the tire 20. The carcass plies 22 are anchored around a pair of substantially inextensible annular beads 24. A belt reinforcing structure 26 comprising one or more belt plies 28 is disposed radially outwardly from the carcass plies 22. The belt plies 28 provide reinforcement for the crown region of the tire 20. A circumferentially extending tread portion 32 is located radially outwardly of the belt reinforcing structure 26.

A sidewall portion 33 extends radially inwardly from each axial or lateral tread edge 33A,33B of the tread to an annular bead portion 35 having the beads 24 located therein.

The carcass plies 22 preferably have textile or synthetic cords 22A reinforcing the plies 22. The cords 22A are preferably oriented radially. Most preferably, the cords 22A are made of polyester or nylon material. Typically, the tire 20 may have two, three or four plies 22, each construction increasing in load carry capability as a function of the number of plies.

The belt reinforcement structure 26 preferably includes at least two belts 28 reinforced by synthetic cords of rayon or aramid.

Now referring to FIGS. 1–5, a tire 20 according to the present invention is illustrated. The tire 20 according to the present invention has a unique tread 32. The tread 32 has a first tread edge 33A and a second tread edge 33B. Disposed between the tread edges 33A,33B is an inner tread 34 and a plurality of lugs 50A,50B and 50C extending radially outwardly from the inner tread 34.

Figure 4:
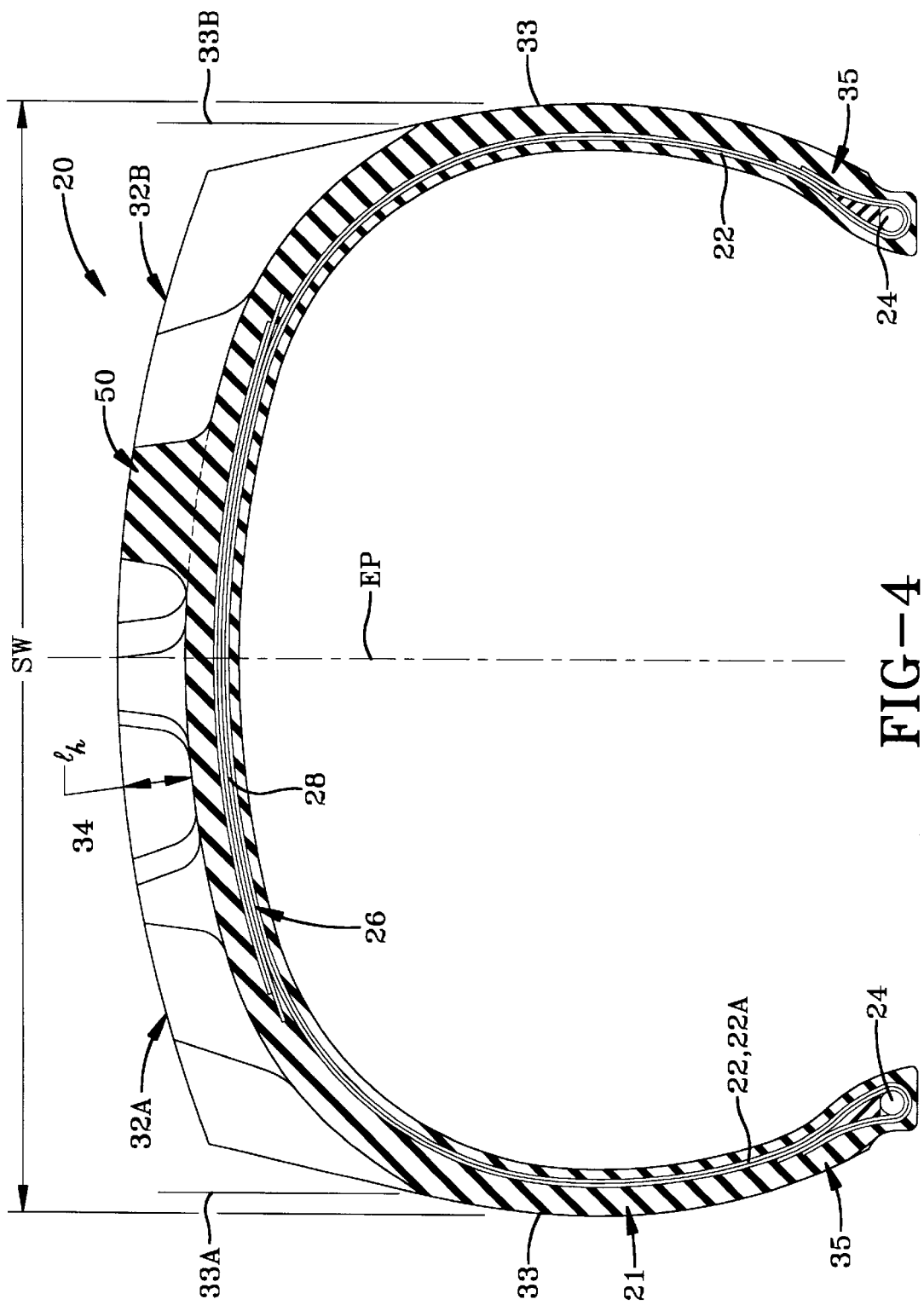
FIG. 4 is a cross-sectional view of the preferred tire taken along lines 5—5 of FIG. 2.

As illustrated in FIG. 4 each lug 50A,50B and 50C has a radially outer surface 58, a first edge 52, second edge 54 and a centerline 63 between the first and second edges. Each lug 50A and 50B extends generally axially inwardly from an axially outer end 51 to an axially inner end 53. Each lug 50 intersects the equatorial plane EP and has an orientation substantially aligned with the lugs 50A as shown.

Figure 6A:
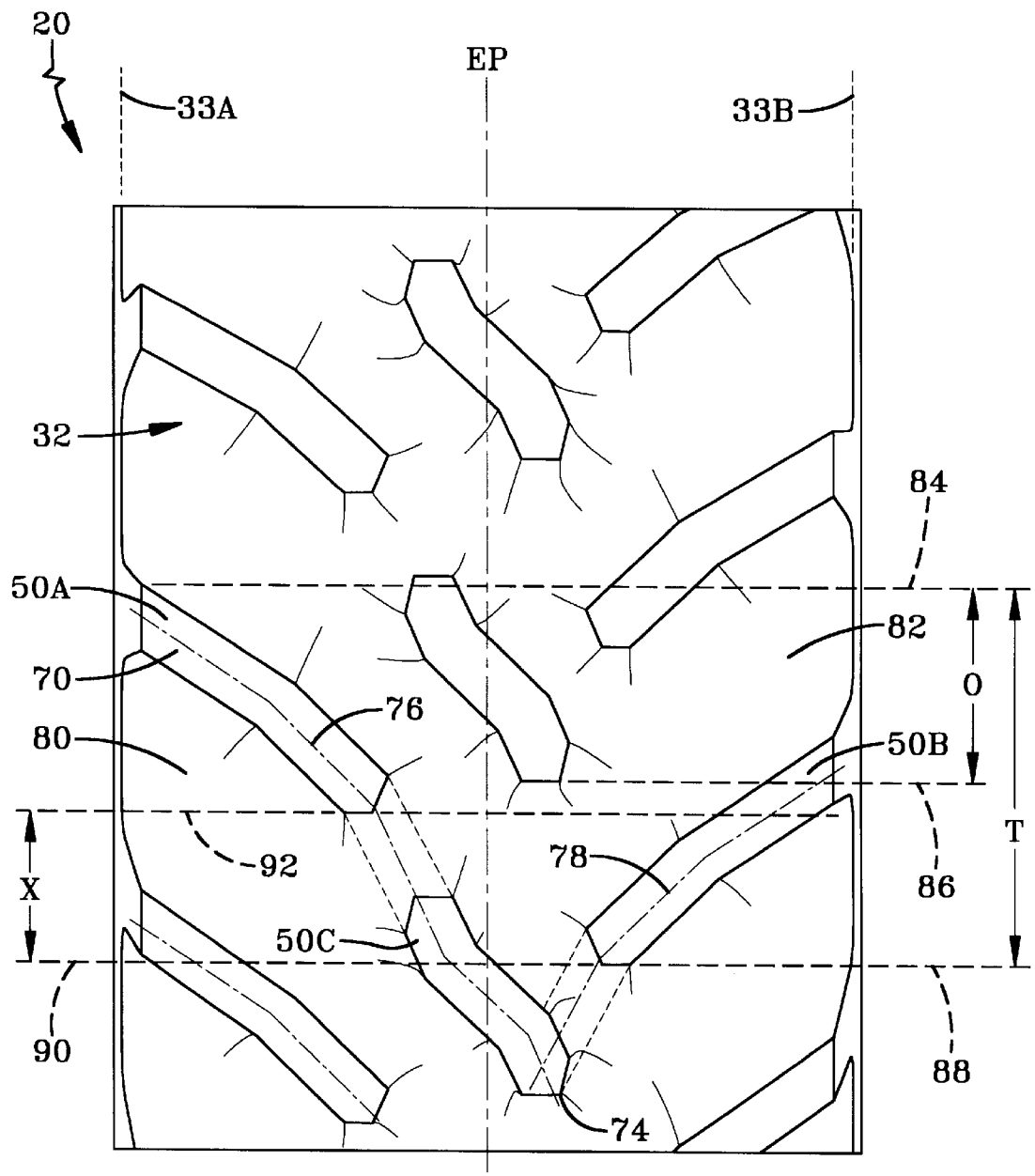
FIG. 6A and FIG. 6B are fragmentary view of a tread portion of a first and second embodiment of the inventive tire.
Figure 6B:
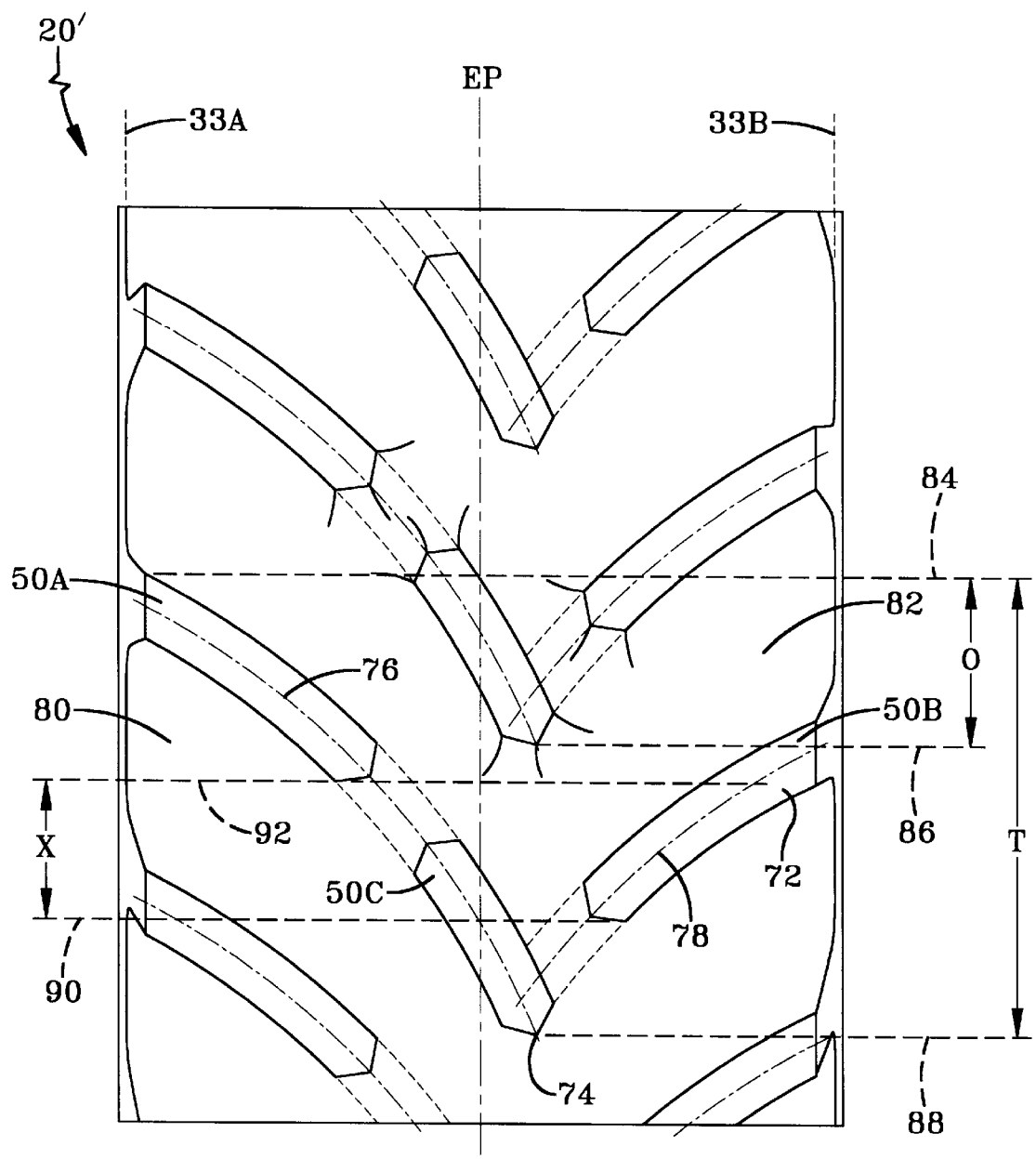

As illustrated in FIGS. 6A and 6B the radially outer surface 58 when viewed from the contact patch has a polygonal shape. The surface 58 when encompassed by a rectangle 65 exhibits the approximate orientation of the lug 50A,50B,50C. For purposes of this invention the centerline 63 of the lugs 50A,50B or 50C is approximated by a line extending substantially parallel to the first and second edges 52,54 and being generally equidistanced between these edges.

It is important to note that lugs have a length $l_l$, at least three times their width $l_w$, whereas block elements have a width greater than one-third the length of the element. A lug for purposes of this invention has a length $l_l$ at least 10% of the section width (SW) of the tire 20.

The distance along the centerline 63 between the axially outer and inner ends 51,53 defines the length ($l_l$) of the lug 50.

The distance extending substantially perpendicularly between the first and second edges 52,54 of the lug define the lug width ($l_w$). The radial distance extending between the inner tread 34 and the edges 52,54 of the lug 50 defines the radial lug height ($l_h$). Preferably, the ratio of the shoulder lug width ($l_w$) to lug radial heights ($l_h$) is less than two-thirds over at least 70% of the lug length ($l_l$).

As the shown in FIGS. 6A and 6B the lugs 50A,50B, and 50C are oriented in such a fashion that the shoulder lug 50A and the central lug 50C form the primary leg 76 of a chevron shape 70,72 while the shoulder lug 50B is oppositely inclined and forms a portion of the secondary leg 78 of the chevron 70,72. The lug 50B when connected to the inner point 74 of the chevron 70,72 at the end 53 of the central lug 50C forms the entire secondary leg 78 of the chevron 70,72.

A centerline 63 drawn between the leading edges 52 and trailing edges 54 of each lug 50A,50B and 50C established the general shape of the chevron pattern 70,72.

In the preferred embodiment the chevron 70,72 appearance is similar to a pair of bird wings on the peak of a downward stroke wherein one wing is longer than the opposite wing. This arcuate shape of each leg of the chevron 70,72 creates soil discharge channels 80,82 between the lugs 50A,50B and 50C. The soil discharge channel 80 extending outward through the first lateral edge 33A is substantially larger than the soil discharge channel 82 extending outward through the second lateral edge 33B. Each leg, primary and secondary 76,78 can preferably be spaced an equal distance from a circumferentially adjacent respective primary or secondary leg 76,78. In other words, the chevron patterns 70,72 can be uniformly repeated around the circumference of the tire 20.

The total circumferential extent of the chevrons 70,72 is shown in FIGS. 6A,6B as T. Circumferentially adjacent chevrons 70,72 overlap a distance O, O being at least 25% of T as measured between the axial extending 84,86 and 88. The shoulder lug 50B as shown is circumferentially offset from the shoulder lug 50A by a distance X, X being measured as the distance between axial lines 90,92 as shown in FIGS. 6A,6B and wherein X is at least 50% preferably about 75% of the circumferential extent of the shoulder lug 50A as measured between lines 92 and 84.

Figure 7A:
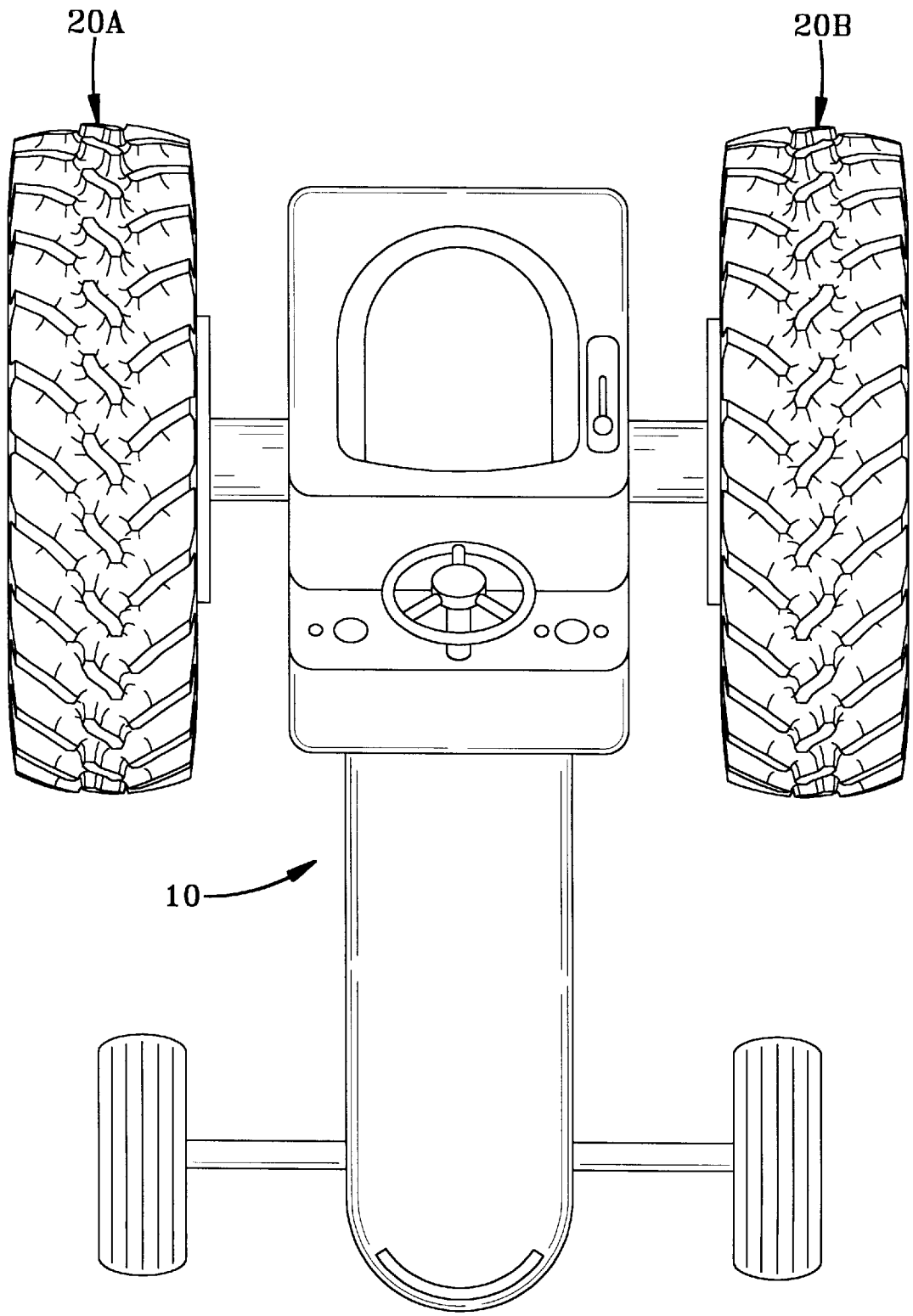
FIG. 7A and 7B are schematic view of the tire according to the invention mounted to a vehicle.

In one embodiment of the invention these tires 20 are made in two distinct molds such that the short secondary legs 78 of the chevron 70 are positioned closest to the lateral edge nearest the tractor 10 when the tires 20 are mounted as shown in FIG. 7A. The resultant effect is that the two tires 20A and 20B working combination push more solid laterally away from the vehicle 10. The lateral forces are balanced and thus offset while the displaced soil act upon the tires tending to give a resultant forward propulsion. This feature would be noticeable in very wet loose or mucky soil conditions.

Figure 7B:
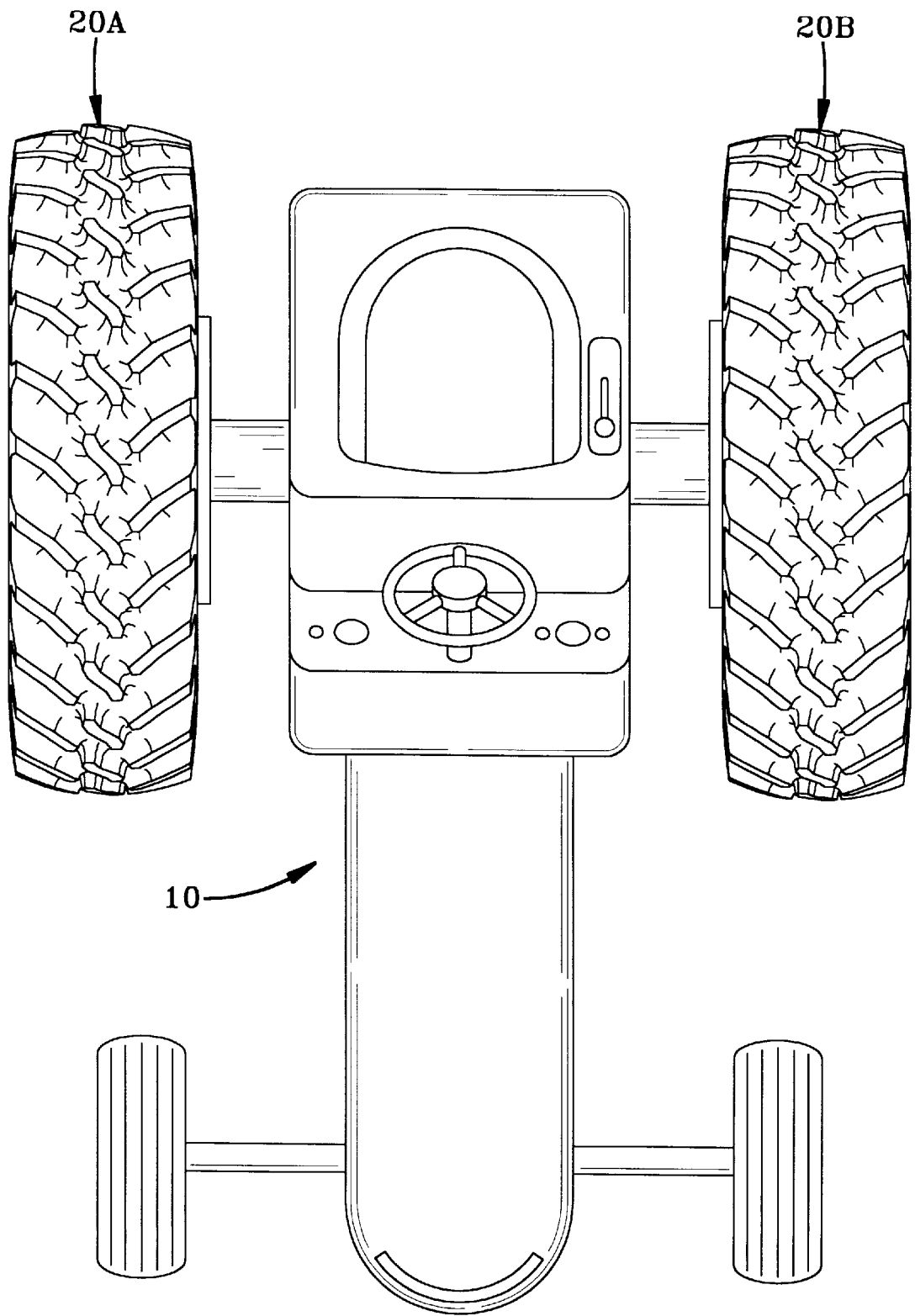

Interestingly, for cost and performance efficiency it has been found that the tires 20 can be produced in a single mold and mounted as shown in FIG. 7B wherein the primary leg 76 of the chevron 70,72 is positioned such that tire 20A has the primary leg 76 outboard of the vehicle while tire 20B has the primary leg 76 inboard of the vehicle 10. This means that the large soil discharge channels 82 are not working in opposite or a balanced configuration as shown in FIG. 7A. Ordinarily one would speculate that the tires 20A,20B would create a slippage moment around the vehicle 10. Interestingly it has been found that the tire 20B anchors the tractor 10 while tire 20A working with tire 20B propel the vehicle forward.

Historically, farm tire designers had heretofore always tried to balance the soil discharge channels 80, in the contact patch such that the amount of soil channeled on each side of the equatorial plane (EP) was equal. This design factor has been the convention even when unequal channels were employed circumferentially. The designer always attempted to achieve this balanced loading effect by alternating the large and small channels on each side of the tread.

The tire 20 of the present invention clearly breaks from that conventional practice, it has an asymmetric directional tread pattern that can maintain the vehicles traction even though employing an imbalanced soil discharge volume, one side of the tire having soil discharge channels 80 being substantially greater than the opposite side 82.

Figure 3:
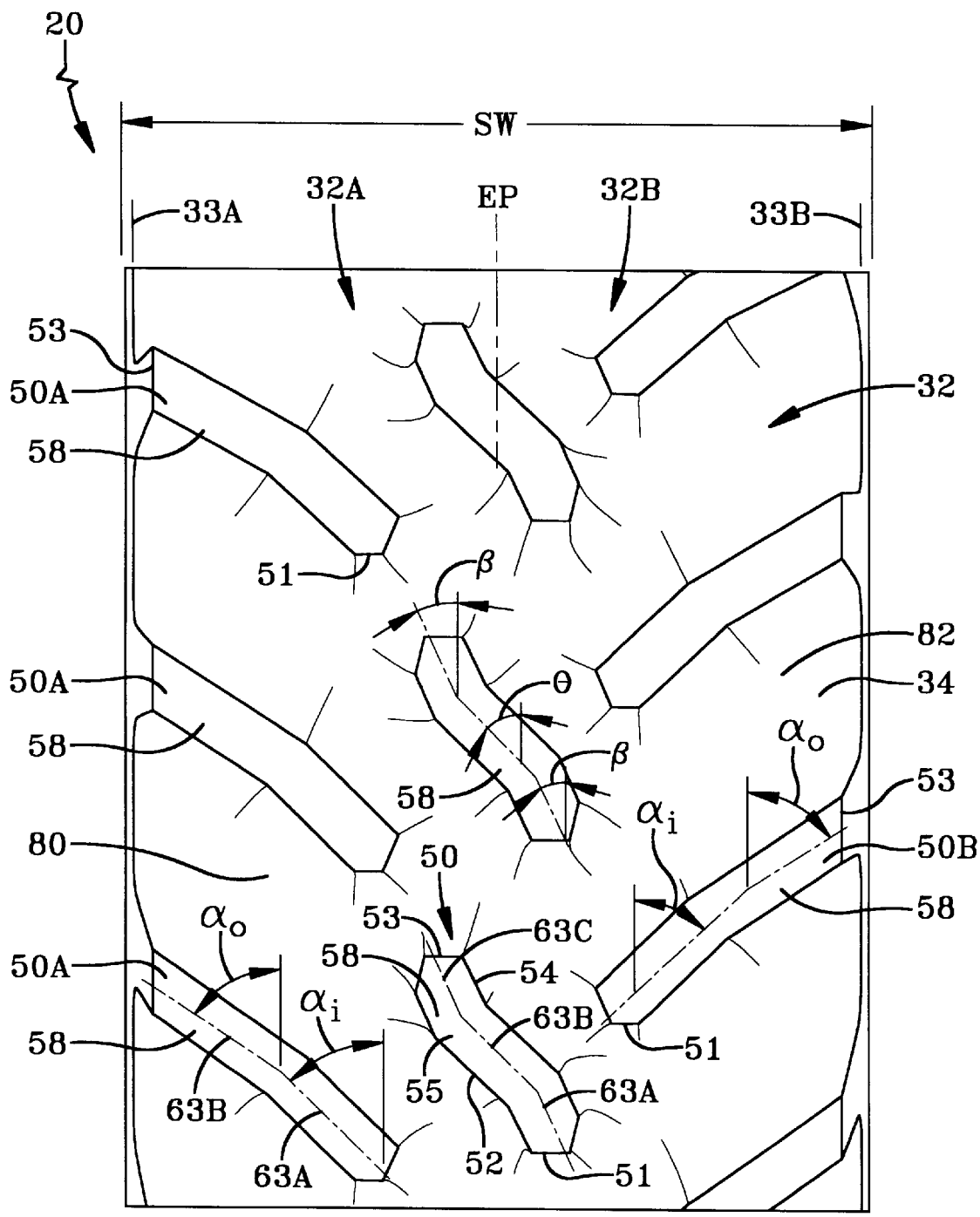
FIG. 3 is a fragmentary view of the tread portion of the preferred tire according to the present invention.

As shown in FIGS. 3 and 5 the preferred tire 20 has both shoulder lugs 50A,50B oriented similarly but opposite in hand. The centerline 63 is broken into an axially inner portion 63A and an axially outer portion 63B, the outer portion being inclined at an $\alpha_0$, $\alpha_0$ being in the range of 60° to 90° relative to the equatorial plane EP. The axially inner portion 63A is inclined at an angle $\alpha_i$ of about 45°.

The central lug 50C has a centerline 63 divided into three parts 63A,63B,63C. The ends 63A and 63B being inclined similarly at a very steep angle β, wherein β, is less than 45° relative to the equatorial plane preferably about 30°. The central portion 63B of the central lug is oriented at an angle θ of about 45° relative to the equatorial plane.

As shown in FIG. 6B an alternative embodiment of the tire 20 is shown wherein the lugs 50A,50B and 50C are shown as curvilinear lugs. The lugs 50A and 50C follow a generally singular curvature and are generally aligned along their lengths. Shoulder lug 50B is oriented such that the leading edge 52 intersects the point 74 of the chevron 72. As can be more readily seen the soil discharge channels 80,82 similarly exhibit the volumetric imbalance taught in the preferred embodiment tire of FIGS. 1–6A.

A most beneficial feature exhibited in both tires is that the resultant lug lengths $l_l$ are quite long as a result of the use of the asymmetric chevron patterns 70,72.

When one compares the inventive tire to the prior art tires, the following is observed in a 480/80R42 (18.4R42) size:

|  | Shoulder Lugs $I_t$ | Central Lugs $I_t$ |
| --- | --- | --- |
| Inventive Tire | 7.87 in. (20 cm) | 5.74 (14.6 cm) |
| DT710 | 6.50 in. (16.5 cm) | 5.55 (14.1 cm) |
| DynaTorque | 7.36 avg. (18.7 cm) (8.64 in. long 6.07 in. short) | NONE |

As can be seen the shoulder lugs are longer than typically can be employed while at the same time being equal in length. This means that the tire will wear uniformly while also achieving no degradation in tractive performance. As can be seen the tire according to the present invention has the lug length of the shoulder lugs greater than the average of the long bar/short bar prior art tires i.e., $l_l > \frac{1}{2} (L_L + L_s)$.

Also due to the use of the asymmetric chevron 70,72 less lugs are needed to create the beneficial circumferential overlap to reduce harsh ride and vibrational problems associated with long bar/short bar tread patterns i.e., N shoulder lug 50A and 50B<N ($L_{L+LS}$) while N shoulder lug 50A, 50B+central lugs 50C>N ($L_L + L_S$). Accordingly, the total surface areas (SA) at the center two-thirds of the tread width (TW) is greater than the total surface area in the same center two-thirds region of the prior art long bar/short bar tread pattern. This means that overall wear durability as well as improved ride characteristics are achieved by the inventive tire when compared to the prior art tires.

It must be appreciated that the actual shape of the individual lugs can be varied as well as their orientation without departing from the spirit of the invention. Furthermore, it is understood that the point 74 of the chevron can lie on one or the other tread half but not both.

What is claimed is:

1. A farm tractor comprising a vehicle having a pair of pneumatic agricultural tires, wherein the pneumatic agricultural tires each have a maximum section width (SW), an axis of rotation, an equatorial plane centered between the maximum section width and perpendicular to the axis, a casing having a carcass reinforced with rubber coated cords, a rubber tread disposed radially outwardly of the casing, the tread having a first and a second lateral tread edge, the distance between the lateral tread edges defining the tread width (TW), the tread has an inner tread and a plurality of tread lugs projecting radically from the inner tread, the tread lugs having a length $(l_l)$ and a width $(l_w)$, the ratio of lug length $(l_l)$ to lug width $(l_w)$ of each lug being at least 3:1, the tread being characterized by:

a plurality of shoulder lugs, the plurality of shoulder lugs being divided into a first row and second row of shoulder lugs extending from each first and second lateral edges respectively toward the equatorial plane, the lugs of the first row being circumferentially offset relative to the lugs of the second row;

a plurality of central lugs oriented in the same direction and arranged in a row and each central lug extending across the equatorial plane, each lug having a lug height $(l_h)$, the ratio of the shoulder lug width $(l_w)$ to shoulder lug height $(l_h)$ being less than ⅔ over at least 70% of the shoulder lug length $(l_l)$;

wherein the lugs of the first row of shoulder lugs are substantially aligned with the central lugs along their respective lug lengths and the shoulder lugs of the second row are oppositely oriented relative to the first row of shoulder lugs, the combination of shoulder lugs and central lugs forming an asymmetric directional tread with a chevron pattern having a point of the chevron pattern located between the equatorial plane and the second lateral edge, a primary leg of the chevron pattern lying along the substantially aligned lengths of the shoulder lugs of the first row and the central lugs, and a secondary leg of the chevron pattern lying along the length of the shoulder lugs of the second row and the point of the chevron pattern, and wherein the tread has a net-to-gross ratio less than 35% and each leg of the chevron pattern creates soil discharge channels extending outward through the lateral edges, the soil discharge channels extending outward through the first lateral edge being substantially larger than the soil discharge channels extending outward through the second lateral edge, the central lugs spaced a minimum distance of 1.5 times the central lug width $(l_w)$ from an adjacent central lug such that the central lugs do not overlap in the circumferential direction.

2. The farm tractor of claim 1 wherein the pneumatic agricultural tire has each of the shoulder lugs of the first row being of the same shape and length.

3. The farm tractor of claim 1 wherein the pneumatic agricultural tire has each of the shoulder lugs of the second row being of the same shape and length.

4. The farm tractor of claim 1 wherein the pneumatic agricultural tire has the shoulder lugs of the first row and the second row being of the same shape and length.

5. The farm tractor of claim 1 wherein the pneumatic agricultural tire has circumferentially adjacent chevron patterns having a circumferential overlap as measured by axially drawn lines, the distance between the lines at the extremes of the circumferential overlap being at least 25% of the total circumferential extent of a chevron pattern.

6. The farm tractor of claim 1 wherein the pneumatic agricultural tire has the shoulder lugs each having an axially outer end and an axially inner end, the axially outer ends of the shoulder lugs of the first row being circumferentially offset relative to the axially outer ends of the shoulder lugs of the second row as measured as the distance circumferentially between axial lines tangent to the extremes of the axially outer ends, the circumferential offset distance being at least 75% of circumferential distance between the axial inner and axially outer ends of a shoulder lug of the first row.

7. The farm tractor of claim 1 wherein the pneumatic agricultural tire has the net-to-gross ratio as measured around the entire circumference of the tire being about 22%.

8. The farm tractor of claim 1 wherein the pneumatic agricultural tire has each tread lug being spaced a minimum distance of 1.5 times the lug width from an adjacent lug.

* * * * *